(12) United States Patent
Hughes et al.

(10) Patent No.: US 7,278,290 B1
(45) Date of Patent: Oct. 9, 2007

(54) PROJECTILE IMPACT ENERGY AND LOCATION MEASUREMENT SYSTEM

(75) Inventors: Derke R. Hughes, Warwick, RI (US); Jeffrey T. Feaster, Wakefield, RI (US); James E. Hooper, Tiverton, RI (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 11/489,809

(22) Filed: Jul. 17, 2006

(51) Int. Cl.
*G01P 21/00* (2006.01)
*G01P 15/00* (2006.01)
*G01M 7/00* (2006.01)
*G01N 3/00* (2006.01)
*B28B 1/16* (2006.01)
*C09K 11/00* (2006.01)
*B29D 28/00* (2006.01)

(52) U.S. Cl. ............... 73/12.11; 73/1.37; 264/257; 264/21; 264/103

(58) Field of Classification Search ............... 73/12.11, 73/167, 1.37; 264/254, 21, 103
See application file for complete search history.

(56) References Cited

U.S. PATENT DOCUMENTS

| | | | | |
|---|---|---|---|---|
| 3,792,354 A | * | 2/1974 | Slaght et al. | 324/178 |
| 4,239,962 A | * | 12/1980 | Oehler | 250/222.2 |
| 4,305,142 A | | 12/1981 | Springer | |
| 4,470,292 A | * | 9/1984 | DeClark et al. | 73/11.02 |
| 4,611,993 A | * | 9/1986 | Brown | 434/21 |
| 4,845,690 A | * | 7/1989 | Oehler | 368/113 |
| 5,160,776 A | * | 11/1992 | Li et al. | 428/109 |
| 5,242,830 A | | 9/1993 | Argy et al. | |
| 5,325,701 A | * | 7/1994 | Zilliacus | 73/12.04 |
| 5,349,853 A | * | 9/1994 | Oehler | 73/167 |

(Continued)

FOREIGN PATENT DOCUMENTS

GB    2264358 A  *  8/1993

(Continued)

OTHER PUBLICATIONS

Womack et al., Measurement of Triboluminescence and Proton Half Brightness Does for ZnS:Mn, IEEE Transactions on Nuclear Science, vol. 51, No. 4, Aug. 2004, 1737-1741.*

(Continued)

*Primary Examiner*—Edward Lefkowitz
*Assistant Examiner*—Jonathan Dunlap
(74) *Attorney, Agent, or Firm*—James M. Kasischke; Jean-Paul A. Nasser; Michael P. Stanley

(57) ABSTRACT

A projectile impact energy and location measurement system is taught employing a target apparatus having an impact plate of a solid durable substance such as steel or titanium. Disposed over the plate is a layer of elastoluminescent material composed of zinc sulfide and manganese embedded in an elastomeric composite. This luminescent material is designed to emit light or exhibit luminescence when elastically strained, for example when a projectile strikes the material. Optical photosensitive sensors are deployed at strategic locations to observe and record color images of the target before during and after impact by a projectile. These images capture the target luminescence and impact location of the projectile. The images are transmitted to a traditional image processing system that can isolate the impact location and correlate the light wave length with a known kinetic energy value that was obtained through initial calibration of the system.

10 Claims, 6 Drawing Sheets

U.S. PATENT DOCUMENTS

| | | | | |
|---|---|---|---|---|
| 5,366,229 | A | * | 11/1994 | Suzuki .......................... 463/5 |
| 5,393,064 | A | | 2/1995 | Beard, III et al. |
| 5,394,824 | A | | 3/1995 | Johnson, Jr. |
| 5,905,260 | A | * | 5/1999 | Sage et al. .................. 250/306 |
| 5,918,262 | A | | 6/1999 | Sanford |
| 5,924,867 | A | * | 7/1999 | Lautsbaugh ................... 434/11 |
| 6,020,594 | A | * | 2/2000 | Tschudi ................. 250/559.32 |
| 6,367,800 | B1 | | 4/2002 | Sheck et al. |
| 6,414,747 | B1 | * | 7/2002 | Hardy ......................... 356/28 |
| 6,698,331 | B1 | * | 3/2004 | Yu et al. .................... 89/36.02 |
| 6,769,287 | B2 | * | 8/2004 | Stewart et al. ............. 73/12.01 |
| 6,856,342 | B1 | * | 2/2005 | Raposa et al. ................ 348/81 |
| 6,875,019 | B2 | * | 4/2005 | Huang et al. ................. 434/14 |
| 6,990,845 | B2 | * | 1/2006 | Voon et al. ................ 73/12.14 |
| 7,127,933 | B2 | * | 10/2006 | Correia et al. ............. 73/12.11 |
| 2002/0064764 | A1 | * | 5/2002 | Fishman et al. ............ 434/252 |
| 2002/0197584 | A1 | * | 12/2002 | Kendir et al. ................ 434/21 |
| 2004/0229394 | A1 | * | 11/2004 | Yamada et al. ............... 438/66 |
| 2005/0268705 | A1 | * | 12/2005 | Gobush ..................... 73/65.03 |

OTHER PUBLICATIONS

Sage et al., Triboluminescent materials for structural damage monitoring, Journal of Material Chemistry, vol. 11, Jan. 8, 2001, 231-245.*

Sage et al., Squeezing light out of crystals: Triboluminescent sensors, SPIE Conference on Smart Materials Technologies, SPIE vol. 3675, Mar. 1999, 169-179.*

Zink et al., Triboluminescence of Sugars, The Journal of Physical Chemistry, vol. 80, No. 3, 1976, 248.*

Bergeron et al. "Experimental Evidence of Triboluminescence Induced by Hypervelocity Impact", Journal of Impact Engineering, Hypervelocity Impact Symposium 2005, Lake Tahoe, CA, Oct. 9-13, 2005. [online]Nov. 7, 2006 [accessed]May 7, 2007; http://www.sciencedirect.com/science/journal/0734743X.*

* cited by examiner

PROJECTILE IMPACT ENERGY AND LOCATION MEASUREMENT SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention is directed to targets that quantify the kinetic energy of a projectile upon impact with a structure. In particular, the present invention is directed to a unique target that employs elastoluminescent material to quantify the kinetic energy of a projectile upon impact with a target and to locate the impact of the projectile upon the target.

(2) Description of the Prior Art

Currently, technology is being sought that can destroy or deter incoming torpedoes. Researchers are actively developing the technology of super-cavitating munitions, which are essentially high-speed projectiles, for potential use as a countermeasure and means to destroy or deter incoming torpedoes. In order to better develop the technology of super-cavitating munitions, it is necessary to develop a method and apparatus for quantifying the impact location and impact dynamics of high-speed munitions. The kinetic energy of an impact can be used to assess the ability of high-speed munitions to destroy a torpedo. The impact location data can be used to establish the reliability of a projectile. What is needed is a target device that can provide impact kinetic energy and impact location data when struck by a high-speed projectile in an underwater environment.

SUMMARY OF THE INVENTION

It is a general purpose and object of the present invention to disclose a kinetic energy measuring system that employs elastoluminescent materials in a target.

It is a further object of the present invention to combine optical sensors with the target to measure the wave length and intensity of the light emitted by the target.

It is a further object of the present invention to employ a traditional digital image processing system to receive and process data received from the optical sensors.

It is a further object of the present invention to calibrate the invention before using it for testing purposes.

The above objects are accomplished with the present invention by a system employing a target apparatus having an impact plate of a solid durable substance such as steel or titanium. Disposed over the plate is a layer of elastoluminescent material composed of zinc sulfide and manganese embedded in an elastomeric composite. The elastoluminescent material is designed to emit light or exhibit luminescence when elastically strained, for example when a projectile strikes the material. Optical photosensitive sensors are deployed at strategic locations to observe and record color images of the target before, during, and after impact by a projectile. These images capture the target's luminescence at impact and the projectile's impact location. The images are transmitted to a traditional image processing system that can isolate the impact location and correlate the light wave length and intensity with a known kinetic energy value that was obtained through initial calibration of the system.

BRIEF DESCRIPTION OF THE DRAWINGS

A more complete understanding of the invention and many of the attendant advantages thereto will be more readily appreciated by referring to the following detailed description when considered in conjunction with the accompanying drawings, wherein like reference numerals refer to like parts and wherein.

DETAILED DESCRIPTION

Figure 1:
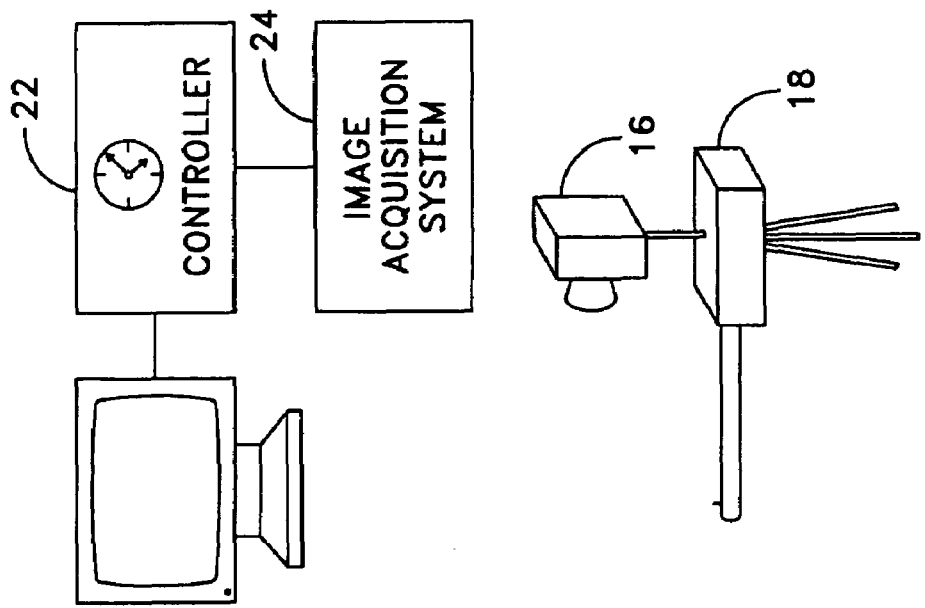
FIG. 1 is an illustration of the system apparatus including the target, sensors, control unit, projectile firing device and image acquisition system.
Figure 1:
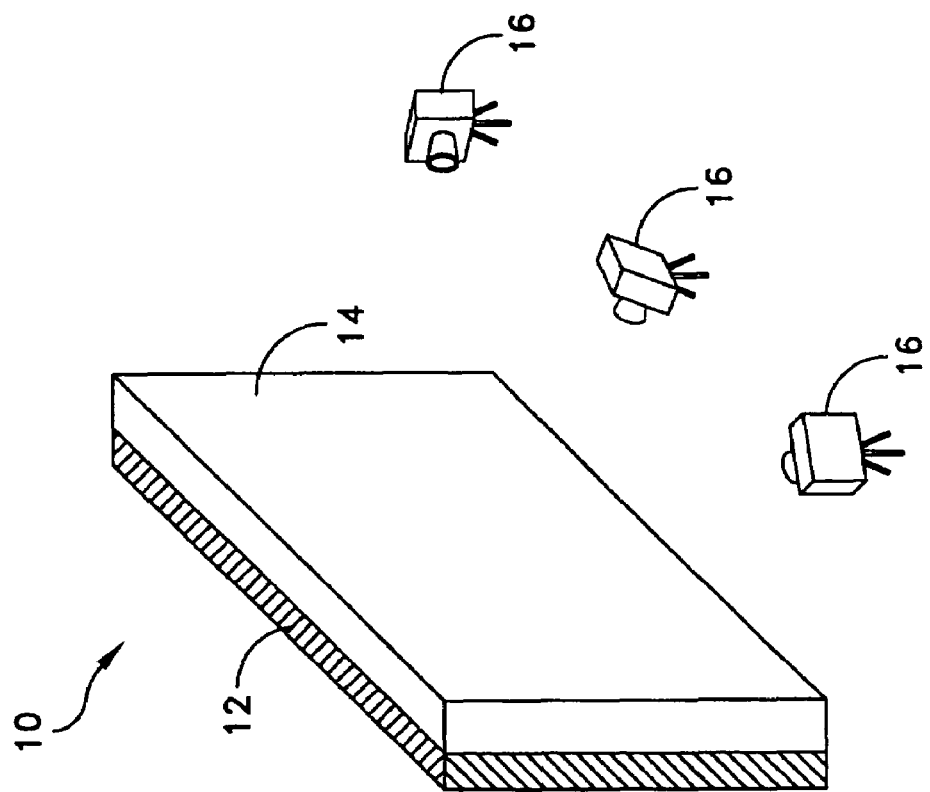

Referring initially to FIG. 1, there is shown a projectile target 10. The target 10 has a solid impact plate 12 made of a durable substance such as steel or titanium. Disposed over the impact plate 12 is a layer of elastoluminescent composite material 14. Elastoluminescent material has the property of exhibiting luminescence when elastically strained. In the preferred embodiment, the elastoluminescent component of the composite material 14 is a chemical compound of zinc sulfide doped with manganese. However, other elastoluminescent materials such as sucrose can also be used. The elastoluminescent chemical compound is coated on fibers of a durable material. In the preferred embodiment the fibers are made of Kevlar. The fibers are woven together. The woven fibers are then transfer molded in an epoxy resin and combined with polyethylene and polypropylene to form a laminate resulting in a unified elastoluminescent composite material 14. This invention is not limited, however, to using polyethylene and polypropylene. Other materials such as poly (ester-ether), poly (ether-amide), poly (ethylene-vinyl acetate), poly (ethylene-methylacrylate), poly (ethylene-acrylic acid), poly (ethylene butylacrylate), poly (ethylene-propylene-diene), or/and ethylene-propylene could also be used. The elastoluminescent composite material 14 has a flexible texture that will deform upon impact with a projectile and then reassume its original shape so that it can be reused.

Referring again to FIG. 1 there is illustrated several optical sensors 16 strategically placed around the target 10. These optical sensors 16 are preferably high-speed color digital cameras capable of recording thousands of frames per second. In the preferred embodiment, the optical sensors 16 are also capable of operating underwater. The optical sensors 16 are located directly in front of the target 10, as well as at either side of target 10, for the purpose of capturing a series of images of projectiles striking the target 10 over a period of time that includes before a projectile strike, during a projectile strike, and immediately after a projectile strike.

Referring again to FIG. 1 there is illustrated a projectile firing device 18. The projectile firing device 18 is located in front of the target 10 at a pre-determined distance, and fires projectiles (not shown) at the elastoluminescent composite material 14. An optical sensor 16 is mounted above the projectile firing device 18.

Referring again to FIG. 1 there is also illustrated a controller 22 and image acquisition and processing system 24. The controller 22 is a digital processing computer with a graphical user interface (GUI). The controller 22 is connected to and controls the projectile firing device 18, the optical sensors 16, the image acquisition and processing system 24 and maintains a system chronometer to synchronize the operation of the system components and measure necessary time variables. The image acquisition and processing system 24 receives the digital images from the optical sensors 16 across either a hardwired or wireless connection depending on in-water or in-air utilization. It then processes the images to make a determination of the kinetic energy of a projectile based upon the wave length and intensity of the light emitted by the target 10. The image acquisition and processing system 24 also superimposes an area grid over images of the target to provide Cartesian coordinates on the location of the projectile impact on the target 10. The image acquisition and processing system 24 includes a data acquisition board, signal conditioner, amplifier, gain, and video output to the graphical user interface of the controller 22. The image acquisition and processing system 24 provides both true images and computer-enhanced images for viewing on the graphical user interface.

In operation the system may be used either in-air (i.e. on land) or in-water (i.e. underwater). A user, through the GUI of the controller 22, will commence the image acquisition processing system 24 that will begin acquiring images of the target 10 through the multiple optical sensors 16. The controller 22 will then initiate the projectile firing device 18 and a projectile will be fired at the target. When the projectile strikes the target 10 light (also referred to as target luminescence) will be emitted from the elastoluminescent composite material 14. The light will be captured in the multiple color images generated from the multiple optical sensors 16. The image acquisition and processing system 24 will take the images from the optical sensors 16 and make a determination of the wavelength and intensity of the light. The wavelength and intensity data is generated by the data acquisition board and signal conditioner and correlated to kinetic energy value by the controller 22 based on a mathematical transfer function. The kinetic energy value is displayed by the controller 22 on the GUI. The image acquisition and processing system 24 also superimposes an area grid over the target image to provide Cartesian coordinates on the location of the projectile impact on the target 10. These images will be made available to a user through the GUI of the controller 22.

Figure 2:
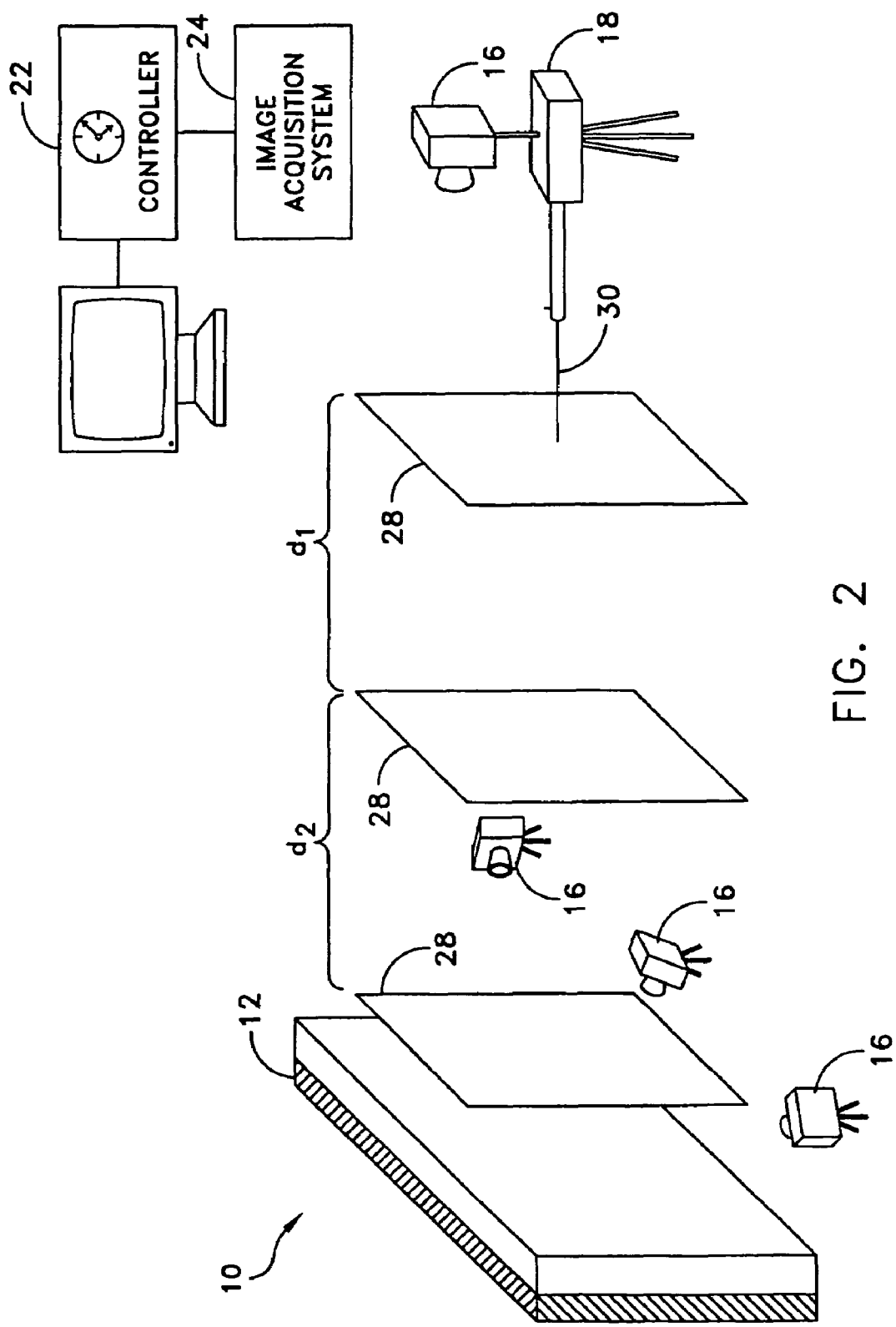
FIG. 2 is an illustration of the system calibration apparatus including break screens, and the system apparatus.

Referring to FIG. 2, there is illustrated the apparatus necessary to calibrate the system prior to its use as a kinetic energy measurement system. Three break screens 28 are positioned at predetermined distances $d_1$ and $d_2$. A projectile of known mass $m_p$ is then fired from projectile firing device 18. The projectile path 30 directly intersects the break screens 28 on route to the target 10. As the projectile passes through each break screen a time $t_n$ is recorded by the system chronometer. The break screen time $t_n$ combined with the known distances $d_1$ and $d_2$ provide sufficient data to calculate a projectile velocity $\Delta v_{Avg}$. This value is then used to calculate a kinetic energy value $KE_{Avg}$. Each value is calculated according to the following respective formulae:

$$d_2/(t_3-t_2)=\Delta v_{Avg} \quad (1)$$

$$KE_{Avg}=m_p \Delta v_{Avg}^2/2 \quad (2)$$

The $KE_{Avg}$ value will be associated with a light wave length and/or intensity emitted by the target 10 upon the impact of the projectile with the target. The above calculations are performed as projectiles of known mass are repeatedly fired at the target 10. By plotting multiple $KE_{Avg}$ values versus the associated wavelengths of the target emitted light, a transfer function is derived to establish a mathematical relationship between the kinetic energy of a projectile and the wave length of the light emitted by the target 10 thereby calibrating the target 10.

Figure 3:
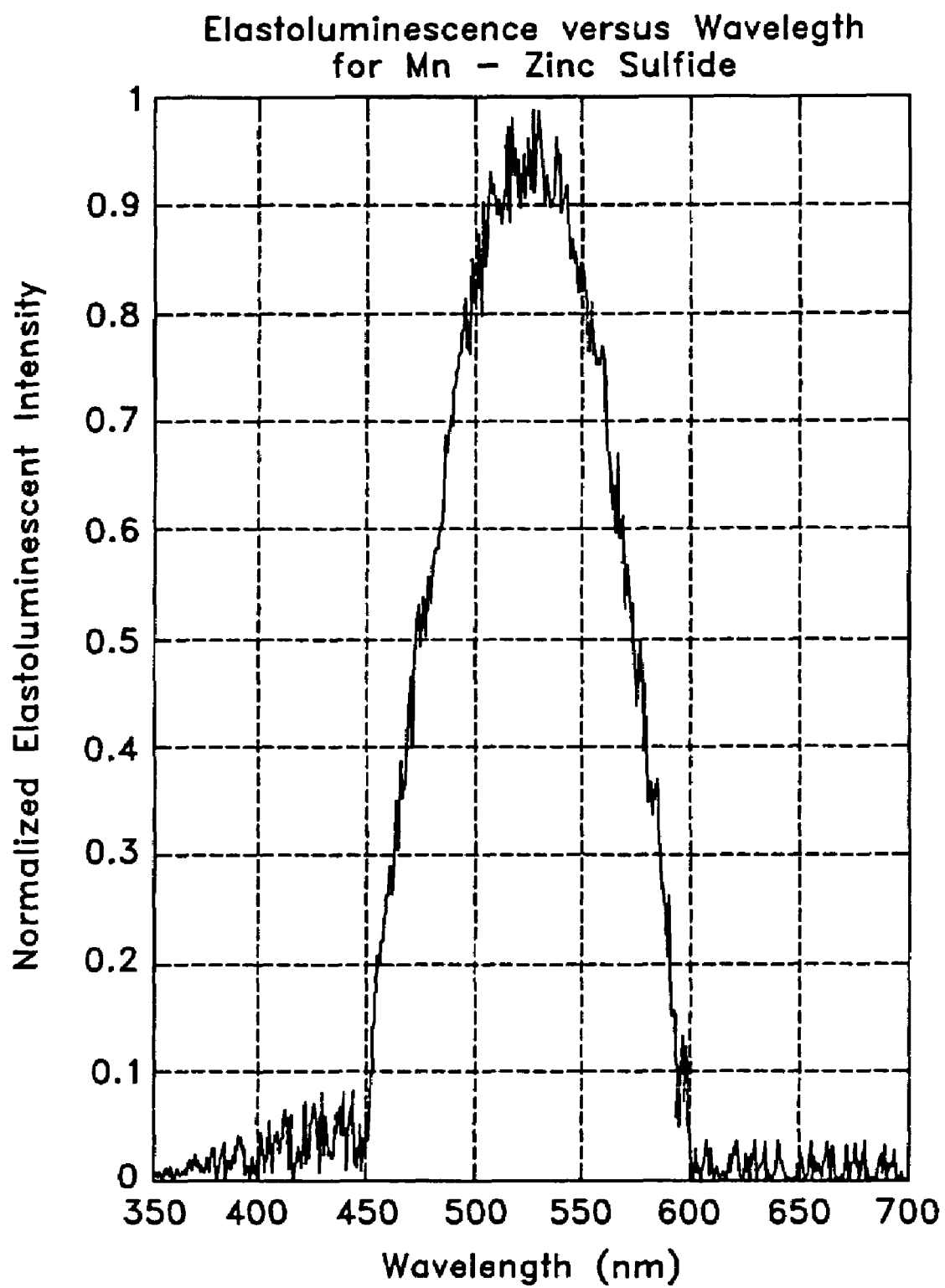
FIG. 3 is a graph of the elastoluminescence versus wavelength of emitted light for a Manganese Zinc Sulfide composite.
Figure 4:
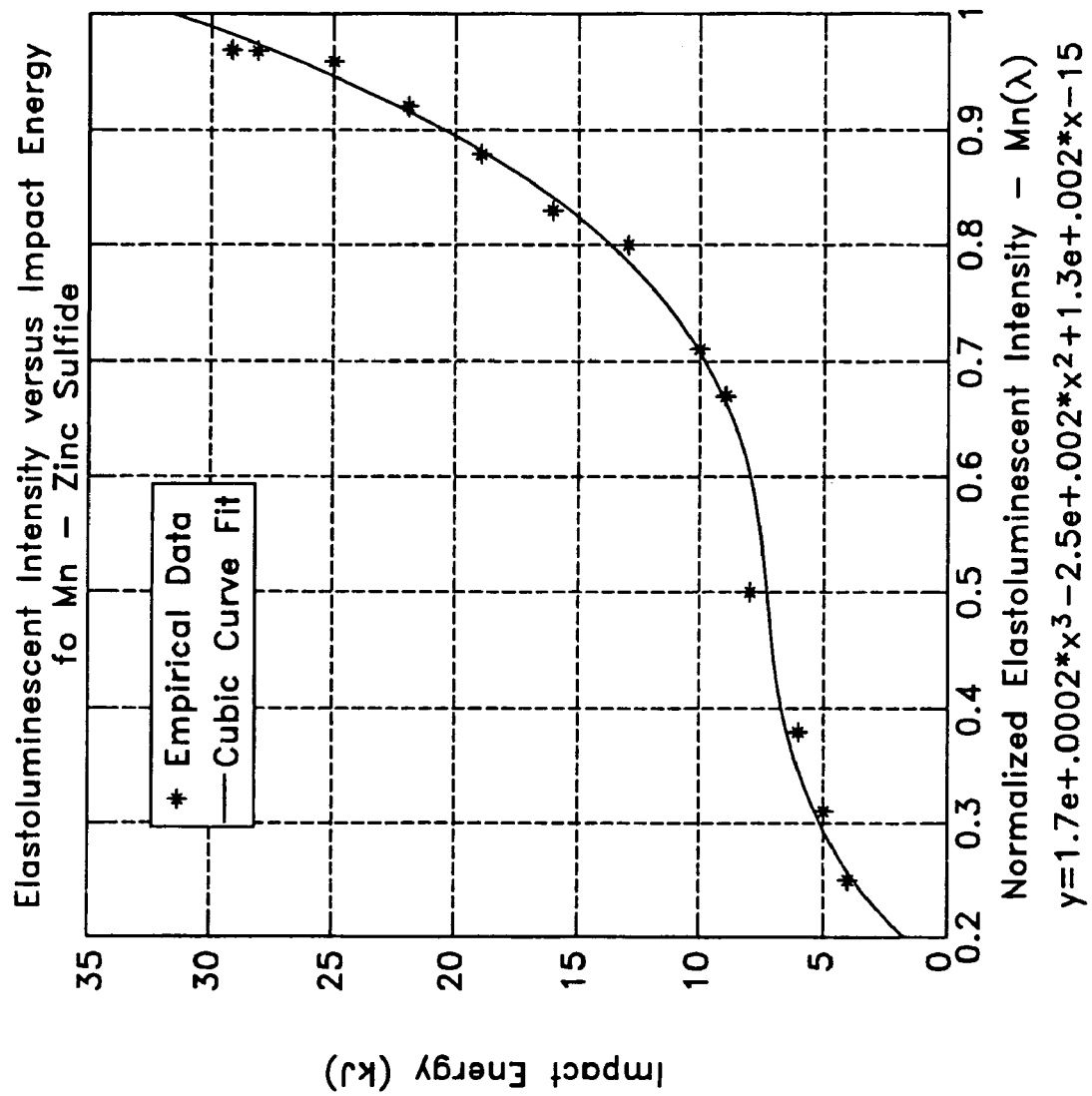
FIG. 4 is a graph of elastoluminescent intensity versus impact energy for a Manganese Zinc Sulfide composite with empirical data.

Referring to FIG. 3, there is illustrated a graph of the elastoluminescence versus wavelength associated with an elastoluminescent composite that uses the chemical compound of zinc sulfide doped with manganese (Mn—ZnS). FIG. 4 illustrates a graph of elastoluminescent intensity versus impact energy for a Mn—ZnS elastoluminescent composite. The cubic curve fit represents the transfer function that will calculate the impact energy based upon the lumens given off by the composite due to the projectile impact. Equation (3) is the transfer function of luminescent intensity to impact energy for a Mn—ZnS composite based upon the curve fit.

$$KE=1.7e2*I^3-2.5e2*I^2+1.3e2*I-15 \quad (3)$$

The image acquisition system will determine the intensity of the value and the value will be assigned a kinetic energy value based on the empirical data. This empirical data produces the transfer function for projectiles approximately 6 inches long traveling at speeds of approximately 400 to 1000 m/s with kinetic energies of 5 to 32 kJ.

Figure 5:
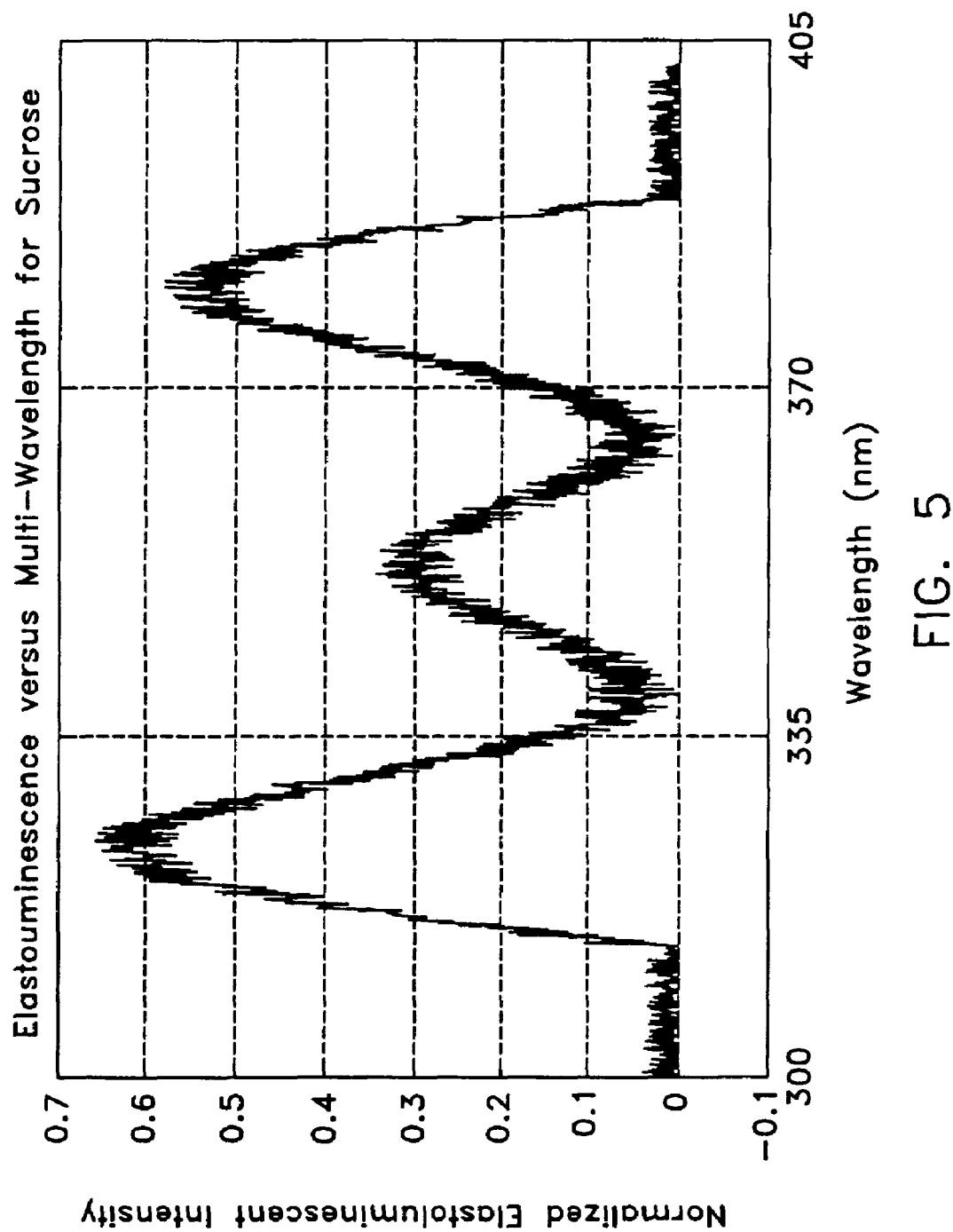
FIG. 5 is a graph of elastoluminescence versus multi-wavelengths of emitted light for a Sucrose composite.
Figure 6:
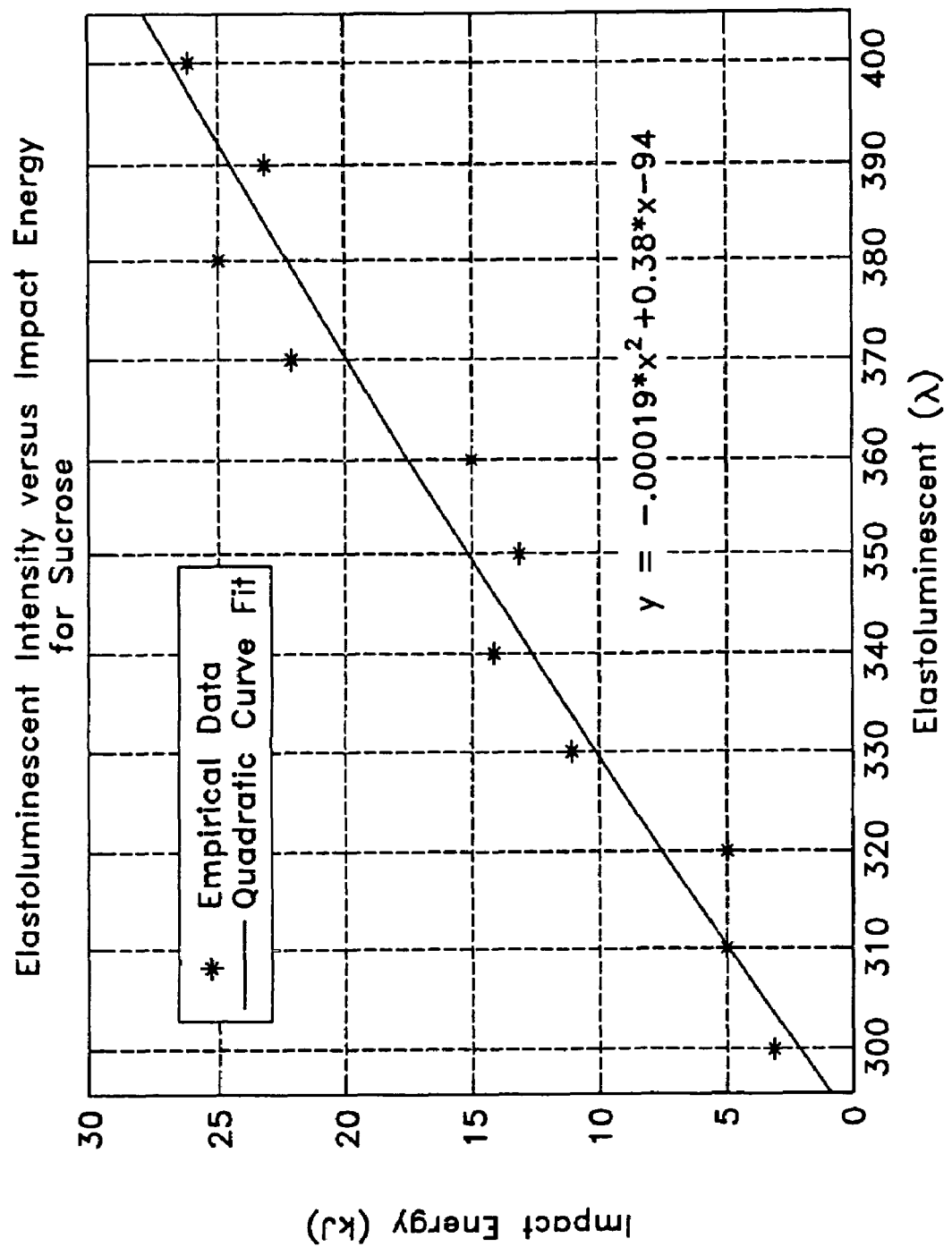
FIG. 6 is a graph of elastoluminescent intensity versus impact energy for a Sucrose composite with empirical data.

Referring to FIG. 5, there is illustrated a graph of the elastoluminescence versus wavelength associated with an elastoluminescent composite that uses sucrose which emits luminescence at several wavelengths. FIG. 6 illustrates a graph of empirical measurements of elastoluminescent intensity versus impact energy for sucrose. This graph from the empirical data reveals that one impact energy range produces closely matched wavelengths. Therefore, a transfer function of luminescent intensity to impact energy for sucrose can be generated as shown in equation (4).

$$KE=-0.0019*I^2+0.38*I-94 \quad (4)$$

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s). Therefore, it will be understood that the appended claims are intended to cover all such modifications and embodiments, which would come within the spirit and scope of the present invention.

What is claimed is:

1. A system for measuring a projectile impact energy and impact location comprising:

a target apparatus having an impact plate of a solid durable substance;

a layer of elastoluminescent composite material disposed over said impact plate;

a projectile firing device which fires at least one projectile at said target apparatus from a predetermined distance;

a plurality of optical photosensitive sensors deployed at strategic locations to observe and record color images of said target before during and after impact by a projectile, wherein these images will capture a target luminescence and an impact location of a projectile fired at said target, wherein said target luminescence has a distinct intensity and wave length;

a traditional image processing system to receive the color images transmitted from said plurality of optical photosensitive sensors that can isolate said impact location by superimposing an area grid with Cartesian coordinates over said color images of said target and measure said target luminescence intensity and wavelength; and a system controller, wherein said controller is connected to and controls and receives data from the projectile firing device, the plurality of optical sensors, and the image acquisition and processing system and correlates said target luminescence wave length and said target luminescence intensity with a known kinetic energy value that was obtained through initial calibration of the system.

2. The system of claim 1 wherein said system controller is a digital processing computer with a graphical user interface that displays said color images.

3. The system of claim 1 wherein said impact plate of a solid durable substance is made of steel.

4. The system of claim 1 wherein said impact plate of a solid durable substance is made of titanium.

5. The system of claim 1 wherein said layer of elastoluminescent composite material is composed of an elastoluminescent component embedded in a durable elastomeric material, wherein said elastoluminescent composite material exhibits luminescence when elastically strained.

6. The system of claim 5 wherein, the elastoluminescent component of the elastoluminescent composite material is a chemical compound of zinc sulfide doped with manganese.

7. The system of claim 5 wherein, the elastoluminescent component of the elastoluminescent composite material is sucrose.

8. The system of claim 5 wherein the elastoluminescent component is coated on fibers made of Kevlar that are then woven together and then transfer molded in an epoxy resin and then combined with polyethylene and polypropylene to form a laminate resulting in a unified elastoluminescent composite material.

9. The system of claim 1 wherein said plurality of optical photosensitive sensors are color digital cameras capable of operating underwater and taking thousands of frames per second.

10. A method of calibrating a projectile impact energy and impact location measurement system comprising:

positioning a first break screen, a second break screen, and a third break screen at predetermined distance $d_1$ between said first break screen and said second break screen, and predetermined distance $d_2$ between said second break screen and said third break screen;

firing a projectile of known mass $m_p$ from a projectile firing device;

directing the projectile path such that it directly intersects the break screens on route to an elastoluminescent composite target that emits light;

recording a pass time $t_n$ as the projectile passes through each break screen;

combining the pass time $t_n$ with the known distances $d_1$ and $d_2$ to calculate a projectile velocity $\Delta v_{Avg}$ according to the formula $d_2/(t_3-t_2)=\Delta v_{Avg}$;

calculating a kinetic energy value $KE_{Avg}$, wherein kinetic energy value is calculated according to the formula $KE_{Avg}=m_p\Delta v_{Avg}^2/2$;

associating the $KE_{Avg}$ value with a light wavelength and intensity emitted by the target upon the impact of the projectile with the target;

plotting multiple $KE_{Avg}$ values versus the associated wavelengths and intensities of the target emitted light;

deriving a transfer function to establish a mathematical relationship between a kinetic energy $KE_{Avg}$ of a projectile and a wavelength and intensity of a light emitted by the target, thereby calibrating the projectile kinetic energy and location measurement system.

* * * * *